(No Model.) 2 Sheets—Sheet 1.
F. FREY.
INCUBATOR.
No. 488,994. Patented Jan. 3, 1893.
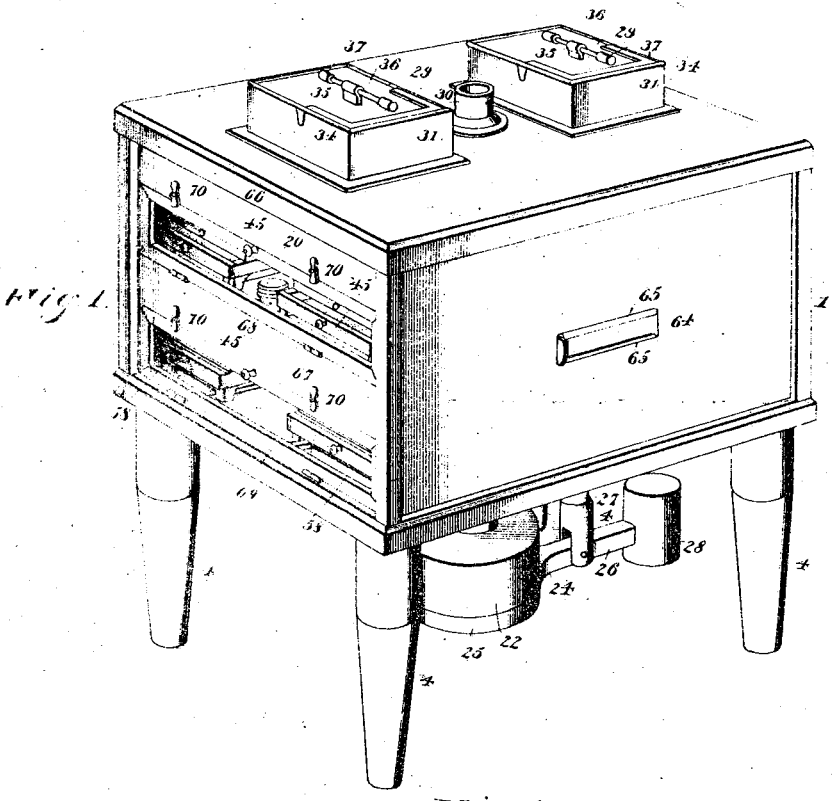
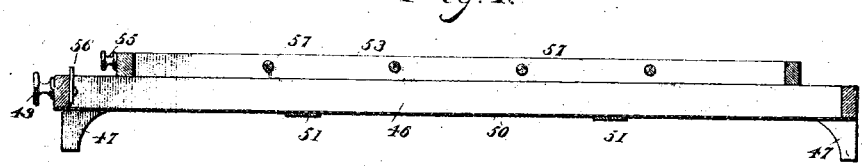
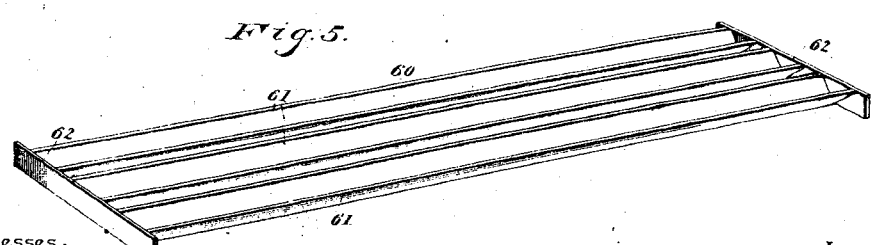
Witnesses:
J. M. Withers
R. H. Dayton
Inventor,
Frank Frey.
By his Attorneys,
C. A. Snow & Co.

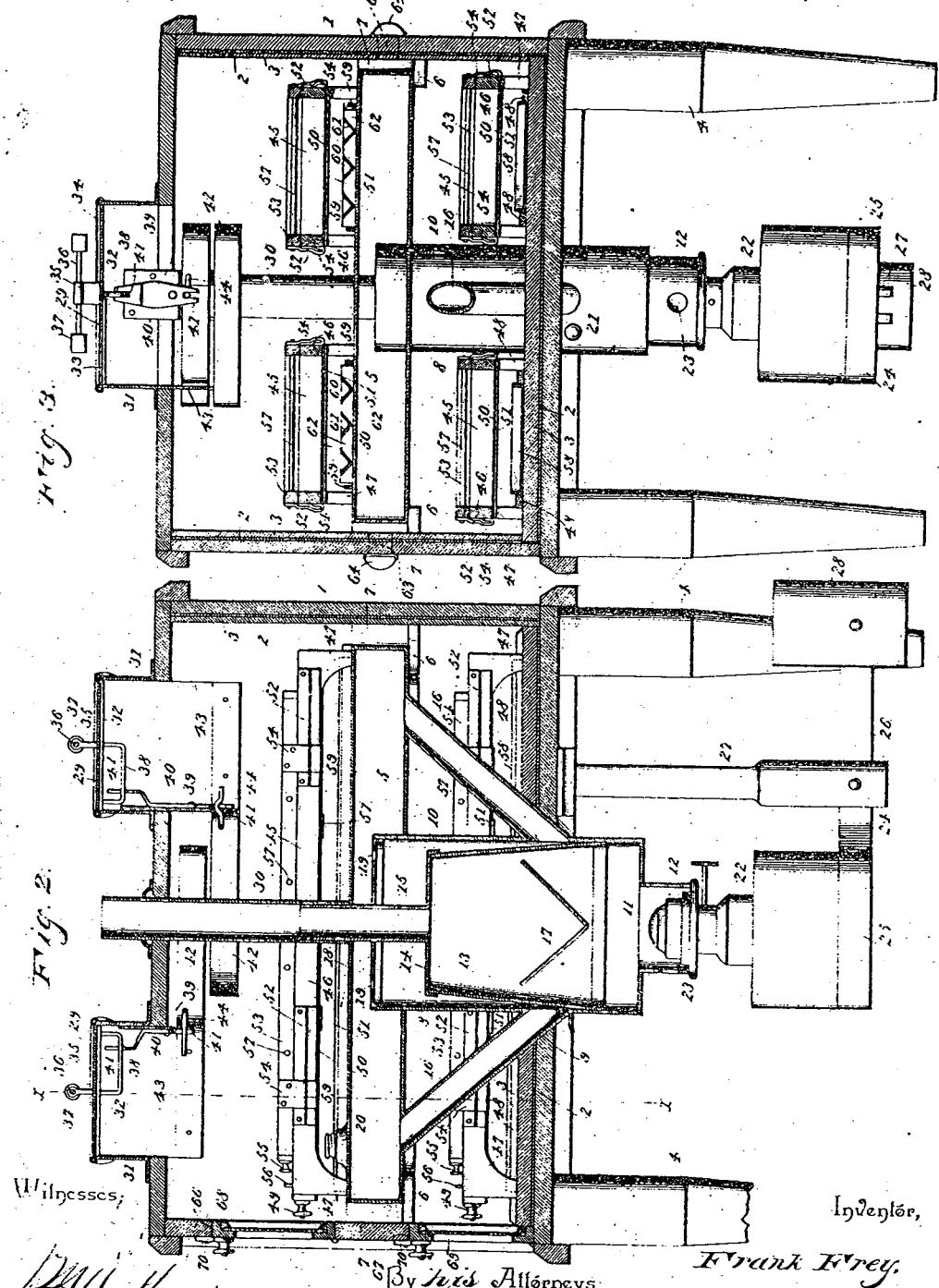

UNITED STATES PATENT OFFICE.

FRANK FREY, OF QUINCY, ILLINOIS, ASSIGNOR, BY MESNE ASSIGNMENTS, OF TWO-THIRDS TO CLARENCE A. MYERS, WILLIAM B. DEAN, AND JOHN W. MYERS, OF SAME PLACE.

INCUBATOR.

SPECIFICATION forming part of Letters Patent No. 488,994, dated January 3, 1893.

Application filed September 8, 1891. Serial No. 405,083. (No model.)

*To all whom it may concern:*

Be it known that I, FRANK FREY, a citizen of the United States, residing at Quincy, in the county of Adams and State of Illinois, have invented a new and useful Incubator, of which the following is a specification.

This invention relates to incubators; and it has for its object to provide an incubator in which the heating devices are so located that an equal distribution of heat is obtained throughout all parts of the device, and to provide one in which the heat regulating valves are so constructed and arranged as to be very susceptible to slight changes of temperature, and in which the various parts are so arranged that one portion thereof may be used for hatching while the other is simultaneously used for brooding; and with these and other objects in view the invention consists in a casing having a centrally arranged boiler and a heating tank connected therewith and dividing the casing into an upper and lower compartment and specially constructed and arranged egg trays and moistening pans, all of which are combined in the novel manner hereinafter more fully described, illustrated and claimed.

In the accompanying drawings;—Figure 1 is a perspective view of an incubator constructed in accordance with my invention. Fig. 2 is a vertical longitudinal sectional view of the same. Fig. 3 is a transverse sectional view of the same on the line $x-x$ of Fig. 2. Fig. 4 is a detail in perspective of one of the egg trays. Fig. 5 is a similar view of one of the upper moistening pans.

Referring to the accompanying drawings, 1 designates the boxing or casing within which the various parts of the incubator are located, and the interior walls of said casing are lined with a lining of heavy building paper 2 which is relined with the supplemental lining 3 forming the sides and bottom of the inner part of said casing, which is further provided with the legs or supports 4 upon which the same is mounted and is held off from the ground or from where the incubator may be located a sufficient distance to accommodate the heating devices located beneath. A rectangular heating tank 5, is supported intermediate of the top and bottom of the incubator upon the brackets 6 located at each corner of the casing, and directly above which are the spacing blocks 7 against which the sides of said rectangular tank is designed to firmly bear and be held securely and firmly in its position, and said tank being somewhat smaller in size than the interior of the casing within which it is located permits a free circulation between the upper and lower compartments which are formed by this partitioning heating tank. The said heating tank is heated and supplied with heated water from the boiler 8 located under the same and extending through the opening 9 in the bottom of said casing. Said heater or boiler is composed of a main outer wall 10 of an elliptical shape and which extends centrally through the bottom of said heating tank and projects therein to within a short distance of its inclosing top, so as to allow the water to circulate freely through the tank without impediment, the said end of the boiler projecting within the said tank being perforated to allow the water of ebullition to bubble over, and into the tank, while the bottom of the outer shell 10 extending beneath the bottom of the casing is inclosed and provided with a central perforation 11 from which depends the flange 12 into which the flame from the heating device is designed to burn. The said boiler is further provided with the inner wall 13, which is of a frusto-conical shape extending up from the bottom edge of the shell of the boiler and terminates within said outer shell some distance from the top thereof in an inclosed horizontal top 14 from which projects the conducting tube 15 communicating with the interior of said inner shell which catches all the heat from the flame within the depending flange 12 located at the bottom of the boiler. The construction of the boiler provides between the outer and inner shells thereof an inclosed water space, which is in communication with the interior of the heating tank, through the circulation pipes 16, connecting the said tank with the inclosed water space on opposite sides of said boiler. The lower end of said boiler at the bottom of the inner shell is provided with the V-shaped deflecting plate 17 which spreads the heat from the lamp and equalizes its passage up through the interior of the boiler which causes the water within the water space of the boiler to boil up and over the top of the boiler and into the heating tank from which it again returns to the boiler and is reheated, the same operation repeating itself until the heat is withdrawn from the boiler. The pressure and force of the boiling water is broken by the top plate 18, provided with a series of perforations 19, and secured around the conducting tube 15 directly above the inclosing top 14 of the inner shell of the boiler, and, registering with and fitting tightly within the top portion of the outer shell of the boiler, forms the inclosing top of the water space thereof. Water is supplied to the tank through the screw capped opening 20 located in the top thereof, while the same is removed when desired from the water space of the boiler through a similar opening 21 located near the bottom edge thereof.

The water in the boiler is heated from an ordinary lamp 22, which is secured beneath the boiler and the burner thereof fitting up within the depending flange 12 which acts in the capacity of a chimney therefor, and which is itself provided with the observation opening 23 covered with mica or other material through which the flame can be observed and regulated. The said lamp is held in position up beneath the boiler by means of the horizontal weighted support 24 having an enlarged circular base 25 upon which the lamp is supported and with the reduced arm 26 pivoted between the ends of the bifurcated bracket 27 extending from beneath the bottom of the casing and upon which is designed to be placed the adjustable weight 28 mounted upon said arm and adapted to counterbalance the lamp upon the opposite end of the pivoted support.

The heat within the incubator is regulated as accurately as may be desired by means of the thermostatic valves 29 secured upon the top of the casing on both sides of the smoke tube or pipe 30 which communicates with the conducting tube 15 of the boiler and extends through the top of the casing. The said valves 29 are pivoted in the sides of the extended boxing 31 extending up from the top of the casing and within which the said valves are designed to play and be limited in their movement. On opposite sides of the point of pivot 32 of said valves, the said boxing is provided with the inwardly projecting flanges 33 and 34 in different horizontal planes and which terminate short of said points of pivot and thus while said valves are in their normal closed position form seats or rests for both ends and sides of said valves and at the same time secures a tight joint which prevents the escape of heat when it is not desired, and which form when said valves are opened, stops whereby the extent of motion or play is limited. Brackets 35 are secured centrally to the top of said valves and support the longitudinally adjustable rod 36 provided on both ends with the regulating weights 37, and which is designed to be moved back and forth to adjust the valves to any degree of delicacy by which they may be affected and opened by the thermostatic controlling devices, and said valves are further provided on their under sides within the extended boxing with the depending loops 38 secured transversely and centrally across the bottoms thereof and which control the same by being connected with the heat operated devices. Depending within the top of the casing from said extended boxing is the arm or bracket 39 to which is pivotally secured the lever 40 provided at both ends with the vertical slots or slotted perforations 41, which are designed to engage the loops 38 of the pivoted valves and the free ends of the thermostatic bands 42 respectively. Said thermostatic bands 42 are constructed of the usual material which is generally used for devices of this character, and one end of one band is rigidly secured to the depending flange 43 extending from within the extended boxing and encircling the central heat and smoke conducting pipe terminates in an arm 44 which engages the said lowermost slot or perforation of the pivoted operating lever, while one end of a similar band which controls the opposite valve is secured to a similar and similarly lettered depending flange from the opposite valve and also encircles the smoke and heat exit pipe above or below the other thermostatic band as the case may be, and also terminates in an arm 44 which is adapted to engage the lower end of the pivoted operating lever, and thereby according to the fluctuations of heat the valve or valves are controlled.

The egg trays 45 are located in both partitions of the incubator in pairs on both sides of the boiler in the lower partition and on both sides of the conducting tube and upon the heating tank in the upper partition. The said egg trays are constructed of suitable material and have a main rectangular frame 46 from each end of which depend the legs or feet 47 which are designed to span the pairs of longitudinal parallel guide strips 48 which in the case of the bottom partition are formed on both sides of the boiler within said bottom partition, and form ways by means of which the said frame may be readily slid within the incubator or withdrawn by means of the knob or handle 49 located at one end of said frame. The entire bottom of the frame 46 is inclosed by the bottom 50 of perforated sheet metal which while supporting the eggs allows a free circulation of both heat and moisture, said perforated bottom being suitably strengthened at intervals by means of the transverse strengthening strips 51 secured to the bottom sides of said frame and preventing the said inclosing bottom from sagging. Secured to said frame 46 near each end on opposite sides are the opposite pairs of depending guide strips 52 which are designed to steady and accommodate the movement of the supplemental sliding frame 53. Said sliding frame is constructed in the same shape as the main stationary frame, but is somewhat smaller in order to allow a free movement thereof, and is provided with the downwardly extending arms 54 provided at their lower ends with upturned edges which are designed to engage beneath the depending guide strips 52, and along which said arms are adapted to slide as the sliding frame is operated by the operating knob or button 55 secured to the front end thereof and the same is limited in its sliding movement by means of the stop 56 secured to the front end of the main egg tray frame 46.

The supplemental sliding frame is provided with a series of transverse spaced bars 57, between which are formed spaces within which the eggs are placed and which as the sliding frame may be moved backward or forward will cause the eggs to be turned or rolled over in order that all portions of the egg may be equally affected by the heat.

Rectangular moistening pans 58 are adapted to be slid beneath the egg trays between the parallel guide strips 48 secured upon the bottom of the casing and being filled with water moisten the eggs while the same are being heated from the partitioning tank and the boiler within the chamber in which the same are located.

In the upper chamber formed by the heating tank the opposite pairs of guide strips 59 are secured directly to the top of the heating tank and thus the trays over said guide strips obtain a more direct heat from the bottom than those in the lower chamber, and in order to utilize this live heat emanating from the top of the heating tank I provide a specially constructed moistening pan 60 which is also slid beneath the egg trays and between the strips. Said moistening pans 60 comprise a series of longitudinally V-shaped troughs 61 evenly spaced apart to allow the heat to pass between the same and into the egg trays thereabove and are secured together between the end bars 62 by soldering or otherwise.

The lower compartment of the incubator is provided with fresh air through the space or perforation in which the lower end of the boiler is located, and passing around said boiler in its entrance to within the incubator is thereby heated before it circulates in said compartment, while the upper compartment of the incubator is supplied with the necessary fresh air through the side openings 63 communicating with the outer air directly opposite the sides of the central heating tank, and being thrown into contact with said heating tank is heated before circulating within the upper compartment in a similar manner to the heating of the fresh air admitted to within the lower compartment. The admission of air within the upper compartment is controlled by means of the regulating slide 64 working within the guides 65 secured upon the outer sides of the incubator.

The construction and operation of my improved incubator are now thought to be apparent without further description. As has already been noticed, the lower compartment of the incubator formed beneath the central partitioning heating tank may be used for the purpose of brooding while the uppermost compartment directly above the said heating tank is being used for the usual purpose of hatching the chickens. The front end of the casing is provided with the transverse openings 66 and 67 communicating directly with the upper and lower compartments respectively and through which access is had to the same to operate and remove the egg trays in each compartment, and each opening is inclosed by the hinged doors or windows 68 and 69, which are held closed by the ordinary turn buttons 70 and through which by means of the panes of glass within said doors or windows, the interior of the incubator is always in view and observations thereof may always be easily and readily obtained.

Having thus described my invention, what I claim and desire to secure by Letters Patent is;—

1. In an incubator, the combination with the inclosing casing, of a horizontal partitioning tank centrally supported within said casing, forming a separate upper and lower heating compartment and itself forming a shelf for the upper heating compartment, a boiler extending through the lower heating compartment and provided with a perforated top plate projecting slightly within said tank, and divergent circulating pipes connected with said boiler and said tank, the entire body of the boiler and the divergent circulating pipes being exposed within the lower heating compartment between the bottom of the tank and the casing to provide for the heating of said lower compartment independently of the heating tank, substantially as set forth.

2. In an incubator, the combination with the casing; of a boiler provided with a depending circular flange having a side opening and adapted to receive the burner of the lamp, a bifurcated bracket depending from said casing, a horizontal pivoted and balanced lamp support pivotally mounted in said bracket and having an enlarged lamp base and extended arm, and an adjustable weight mounted on said arm and adapted to normally overbalance the lamp and hold the burner within said flange, substantially as set forth.

3. The combination with an inclosed casing having opposite side openings, of a heating tank horizontally partitioning the casing and set in from the sides of the same to provide an air circulating space, a boiler centrally located within the casing and connected to said tank, guides secured to the casing on each side of said side openings, air regulating slides working in said guides and located on opposite sides of said casing over said openings directly opposite the sides of said heating tank, and thermostatic devices for controlling and regulating the temperature of said casing located on opposite sides of the central conducting pipe, substantially as set forth.

4. In an incubator, the combination with the partitioning heating tank forming a shelf and the egg trays resting upon said tank; of the moistening pans resting directly upon said shelf heating tank beneath said egg trays and each comprising a series of longitudinally arranged parallel V-shaped water troughs regularly spaced apart to form spaces or passages for the heat confined beneath the same to pass directly to the egg trays above, substantially as set forth.

In testimony that I claim the foregoing as my own I have hereto affixed my signature in presence of two witnesses.

FRANK FREY.

Witnesses:
B. AWERKAMP,
M. F. SURMEYER.